(12) United States Patent
Zscherp

(10) Patent No.: US 10,190,416 B2
(45) Date of Patent: Jan. 29, 2019

(54) BLADE CASCADE FOR TURBO MACHINE

(71) Applicant: MTU Aero Engines AG, Munich (DE)

(72) Inventor: Carsten Zscherp, Groebenzell (DE)

(73) Assignee: MTU Aero Engines AG, Munich (DE)

( * ) Notice: Subject to any disclaimer, the term of this patent is extended or adjusted under 35 U.S.C. 154(b) by 1311 days.

(21) Appl. No.: 14/248,058

(22) Filed: Apr. 8, 2014

(65) Prior Publication Data

US 2014/0301852 A1 Oct. 9, 2014

(30) Foreign Application Priority Data

Apr. 9, 2013 (EP) .................................... 13162835

(51) Int. Cl.
| | |
|---|---|
| *F01D 5/10* | (2006.01) |
| *B23P 15/04* | (2006.01) |
| *F01D 5/14* | (2006.01) |
| *F01D 9/04* | (2006.01) |
| *F04D 29/32* | (2006.01) |
| *F04D 29/66* | (2006.01) |

(52) U.S. Cl.
CPC ................ *F01D 5/10* (2013.01); *B23P 15/04* (2013.01); *F01D 5/143* (2013.01); *F01D 9/041* (2013.01); *F04D 29/324* (2013.01); *F04D 29/666* (2013.01); *F05D 2250/184* (2013.01); *F05D 2260/961* (2013.01); *Y02T 50/673* (2013.01); *Y10T 29/49337* (2015.01)

(58) Field of Classification Search
CPC . B23P 15/04; F01D 5/10; F01D 5/143; F01D 9/041; F01D 5/142; F01D 11/001; F04D 29/324; F04D 29/666; F05D 2250/184; F05D 2260/961; Y02T 50/673; Y10T 29/49337

USPC ............................................. 415/173.7, 194
See application file for complete search history.

(56) References Cited

U.S. PATENT DOCUMENTS

| | | | | |
|---|---|---|---|---|
| 3,146,938 | A * | 9/1964 | Smith | F01D 11/001 |
| | | | | 415/173.7 |
| 3,937,592 | A * | 2/1976 | Bammert | F01D 5/142 |
| | | | | 415/194 |
| 7,244,101 | B2 * | 7/2007 | Lee | F01D 5/082 |
| | | | | 416/248 |
| 8,043,063 | B2 * | 10/2011 | Kelly | F01D 5/10 |
| | | | | 415/119 |
| 2008/0134504 | A1 | 6/2008 | Schoenenborn | |

(Continued)

FOREIGN PATENT DOCUMENTS

| | | |
|---|---|---|
| EP | 2 336 570 | 6/2011 |
| EP | 2 505 780 | 10/2012 |
| JP | S5254808 | 5/1977 |

(Continued)

*Primary Examiner* — Mark Laurenzi
*Assistant Examiner* — Paul Thiede
(74) *Attorney, Agent, or Firm* — Davidson, Davidson & Kappel, LLC

(57) ABSTRACT

A blade cascade for a turbomachine, in particular a gas turbine, including multiple identical blade groups which are situated next to each other and which each include
a first individual blade (10) having
 a vane (12) having a blade profile and a first side wall (11), and
a second individual blade (20), which differs from the first, having a vane (22) having
a blade profile and a second side wall (21),
the first and second side walls (11, 21) having different contourings.

14 Claims, 2 Drawing Sheets

(56) References Cited

U.S. PATENT DOCUMENTS

2013/0195610 A1* 8/2013 Rose ............... F01D 5/145
 415/1
2014/0072432 A1 3/2014 Woehler et al.

FOREIGN PATENT DOCUMENTS

JP S54151707 11/1979
WO WO2006/084438 8/2006

* cited by examiner

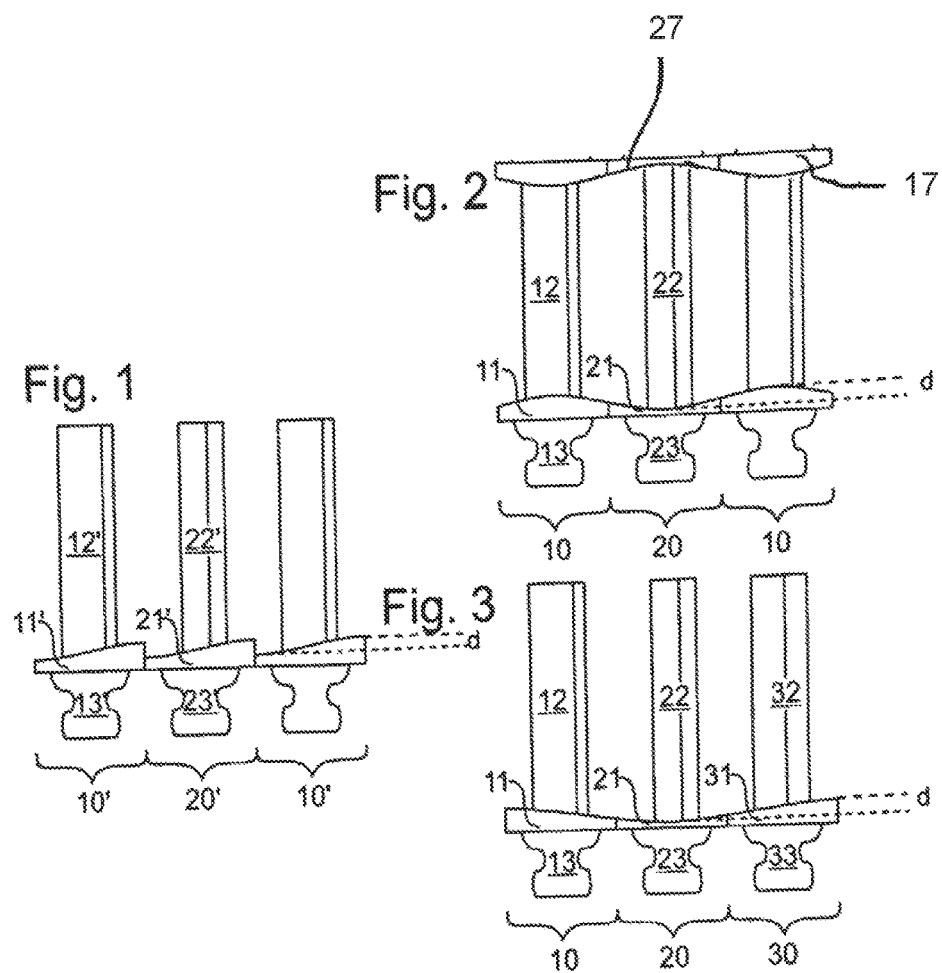

BLADE CASCADE FOR TURBO MACHINE

This claims the benefit of European Patent Application EP 13162835.6, filed Apr. 9, 2014 and hereby incorporated by reference herein.

The present invention relates to a blade cascade for a turbomachine, in particular for a gas turbine, in particular an aircraft engine, including a compressor and/or turbine stage having such a guide and/or moving blade cascade, and to a method for manufacturing such a blade cascade.

BACKGROUND

It is known from practical in-house experience to alternately position different individual blades in the circumferential direction in a blade cascade or a blade row. It is thus possible, in particular, to vary natural frequencies of adjoining individual blades and to reduce undesirable vibration phenomena, in particular aeroelastic excitations—the blade cascade is deliberately "detuned." For example, instead of n identical individual blades, m=n/2 identical blade groups (blade pairs) each having two different individual blades A, B, or m=n/3 identical blade groups (blade triplets) each having three different individual blades A, B, C, could be provided, so that the blade cascade includes identical blade groups having different blades in the circumferential direction: (A, B), (A, B), (A, B), . . . or (A, B, C), (A, B, C), (A, B, C), . . . .

SUMMARY OF THE INVENTION

It is further known from practical in-house experience to contour side walls of blades to improve in particular the efficiency of the blade cascade.

Identical contouring of the side walls of different individual blades of a detuned blade cascade results in a side wall contouring that is periodic with the blade pitch, i.e., the distance between adjoining individual blades in the circumferential direction.

It is an object of the present invention to provide an improved turbomachine having individual blades.

The present invention provides a blade cascade including a plurality of identical blade groups, which are situated next to each other in the circumferential direction. The blades, in particular, may be guide or moving blades; in one refinement they may be guide or moving blades of a gas turbine, in particular of a compressor or turbine stage, preferably of a low-pressure turbine stage.

Each of the blade groups includes a first individual blade having a vane having a blade profile and a first side wall, and a second individual blade, which differs from the first, having a vane having a blade profile and a second side wall. In one embodiment, the blade cascade may thus be intentionally "detuned."

In one embodiment, each blade group is made up of a first individual blade A and a second individual blade B, which differs from the first (A≠B), so that the blade cascade having the identical blade groups (A, B) has the configuration (A, B), (A, B), (A, B), . . . . In another embodiment, each blade group is made up of a first individual blade A, a second individual blade B, which differs from the first (A≠B), and a third individual blade C, so that the blade cascade having the identical blade groups (A, B, C) has the configuration (A, B, C), (A, B, C), (A, B, C), . . . . The third individual blade C and the first or second individual blade A or B may be identical (A=C≠B or A≠C=B). Similarly, the third individual blade C may differ from the first and second individual blades A and B (A≠C≠B). In another embodiment, each blade group is made up of four or more individual blades, of which at least two, in particular all, individual blades are different.

Dissimilar individual blades of a blade group within the sense of the present invention may, in particular, have different blade profiles, masses, rigidities, mass and/or rigidity distributions, in particular to vary their natural frequencies and/or aerodynamic excitations or to "detune" them with respect to each other. Two blade groups are in particular identical blade groups within the sense of the present invention if the two blade groups have the same positioning of individual blades A, B, . . . , i.e., have identical individual blades in the same positions in each case. An individual blade within the sense of the present invention may be attached in particular individually, radially on the inside and/or outside, to a housing or rotor and/or replaceably or permanently, in particular in a form-locked and/or frictionally engaged manner, preferably with the aid of a dovetail joint or an integral joint, preferably by welding or gluing.

In particular, a side wall may include, in particular be, a radially inner and/or outer side wall which defines a working fluid flow channel. In particular, the side wall may include, in particular be, a surface of a blade platform or of a blade root and/or of a blade shroud facing the working fluid flow channel.

According to one aspect of the present invention, it is provided that the first and second side walls have different contourings. According to this aspect, a side wall contouring is thus provided which is aperiodic or not (simple) periodic with the blade pitch and, at the same time, is (simple) periodic with the blade groups, i.e., recurrent with the blade groups.

In this way, the efficiency of the blade cascade is optimizable in one embodiment.

A contouring within the sense of the present invention shall presently be understood to mean in particular the progression of a radial extension r along a circumferential direction coordinate u on at least one axial position x0 and/or along an axial coordinate x on at least one circumferential position u0, i.e., r(u, x0), r(x, u0), or r(u, x), the circumferential direction coordinate u starting in each case on a circumferential end face of a blade group.

Different contourings within the sense of the present invention shall accordingly be understood to mean in particular different progressions of the radial extension: $r_A(u, x0) \neq r_B(u, x0)$, $r_A(x, u0) \neq r_B(x, u0)$ or $r_A(u, x) \neq r_B(u, x)$; $r_A$, $r_B$ denoting the contouring of a side wall of an individual blade A or B. Different contouring of the side walls of two different individual blades may exist in particular in one or multiple cross sections perpendicularly to the rotational axis of the turbomachine and/or in one or multiple meridian sections.

In one embodiment, the contour of the second side wall may deviate in at least one circumferential position in the radial direction by at least 1%, in particular at least 2%, preferably at least 2.5% of a blade height of the blade cascade (see "d" in FIG. 1-3) and/or by at least 0.1 mm, in particular at least 1 mm, preferably at least 2 mm from the contour of the first side wall in a corresponding circumferential position (see "d" in FIG. 1-3), in particular with adjoining first and second individual blades in a position which is offset by one blade pitch in the circumferential direction.

In one refinement, the contour of the second side wall deviates between a first and a second circumferential position, which is offset in particular by at least 10%, preferably at least 25% of the length of the side wall in the circumferential direction, by at least 1%, in particular at least 2%, preferably at least 2.5% of a blade height of the blade cascade and/or by at least 0.1 mm, in particular at least 1 mm, preferably at least 2 mm from the contour of a first side wall between corresponding circumferential positions, in particular with adjoining first and second individual blades in positions which are offset by one blade pitch in the circumferential direction. In particular, the contour of a side wall may deviate in a cross section over at least 10%, in particular at least 25% of the blade pitch from the corresponding area of the adjoining side wall, which is offset by one blade pitch, in the radial direction by at least 1%, in particular at least 2%, preferably at least 2.5% of a blade height of the blade cascade and/or by at least 0.1 mm, in particular at least 1 mm, preferably at least 2 mm.

In one embodiment of the present invention, a contouring of an outside edge of a side wall of the one of the two blades of the outer group, at least essentially, corresponds to the contouring of an outside edge of a side wall of the other of the two blades of the outer group. In one embodiment, in particular radial vibrations between the side walls of adjoining blade groups may thus be reduced, in particular avoided.

In addition or as an alternative, in one embodiment a contouring of an outside edge of a side wall of one, in particular first, individual blade of each blade group may, at least essentially, correspond to the contouring of an adjoining outside edge of a side wall of an adjoining, in particular second, individual blade of each blade group. In one embodiment, in particular radial vibrations between the side walls of adjoining blade groups of one blade group may thus be reduced, in particular avoided.

In one embodiment, the side walls of adjoining individual blades between the blade groups and/or within the blade groups may, at least essentially, transition smoothly into each other.

In one embodiment, intermediate areas between outside edges of the first and second side walls may have different contourings. For example, one of the two side walls may have one or multiple radial depressions and/or thickened areas, the other of the two side walls having no, or a larger or a smaller, radial depression or thickened area at the corresponding spot.

As described above, each blade group may include more than two individual blades, i.e., in addition to the first and the second, which differs from the first, individual blades, the group may include one or multiple further individual blades having a vane having a blade profile and a side wall, it being possible that a further individual blade and the first or second individual blade being identical or different, in particular having different blade profiles, masses, rigidities, mass and/or rigidity distributions.

The side wall of one or multiple such further individual blades may in each case have a contouring which differs from the first and/or second side wall. In addition or as an alternative, the side wall of one or multiple other such further individual blades may have the contouring of the first or second side wall.

BRIEF DESCRIPTION OF THE DRAWINGS

Additional features and advantages are derived from the subclaims and exemplary embodiments, showing partially schematic illustrations.

FIG. 1: shows a top view onto a portion of a moving blade cascade of a gas turbine aircraft engine according to practical in-house experience in the axial direction;

FIG. 2: shows a portion of a moving blade cascade of a gas turbine aircraft engine according to one embodiment of the present invention;

FIG. 3: shows a portion of a moving blade cascade of a gas turbine aircraft engine according to a further embodiment of the present invention.

DETAILED DESCRIPTION

Figure 4:
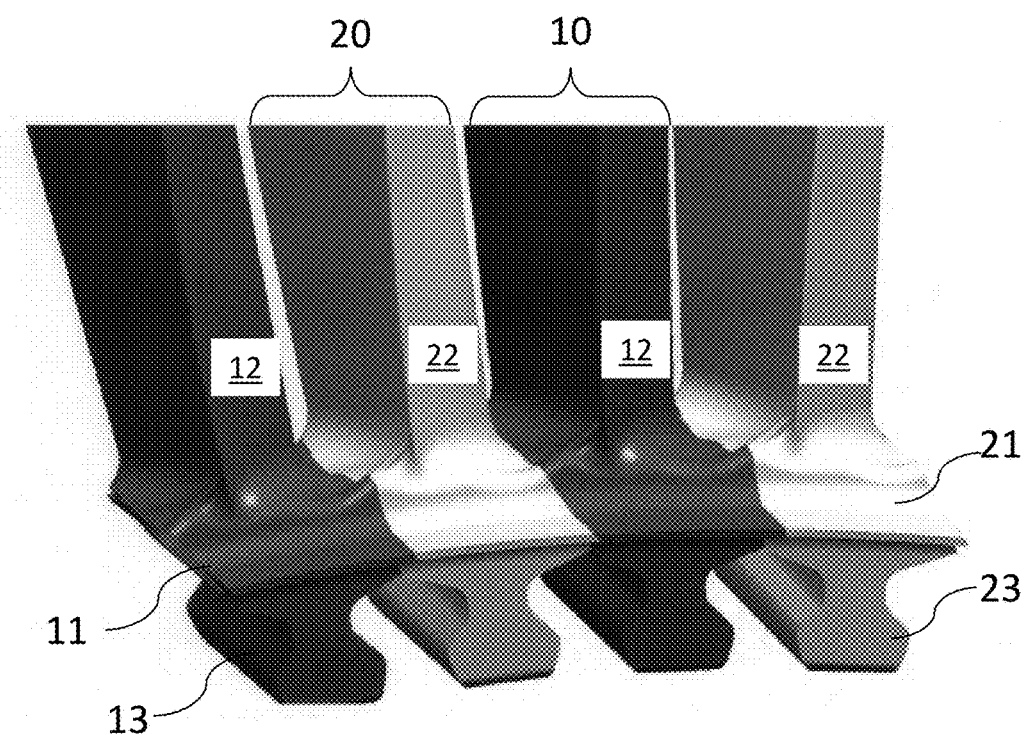
FIG. 4: shows a perspective view of a portion of a moving blade cascade of a gas turbine aircraft engine according to a further embodiment of the present invention.

FIG. 1 shows a top view onto a portion of a moving blade cascade of a gas turbine aircraft engine according to practical in-house experience in the axial direction. The moving blade cascade includes multiple identical blade groups, which are situated next to each other and which in each case have a first individual blade 10' having a radially inner first side wall 11' for defining a working fluid flow channel in the shape of a blade platform, a vane 12' having a blade profile and a dovetail blade root 13', and a second individual blade 20', which differs from the first, having a second side wall 21' in the shape of a blade platform, a vane 22' having a blade profile and a dovetail blade root 23'.

First and second individual blades 10', 20' differ in particular in their blade profiles, as is indicated in FIG. 1 by different leading and trailing edges, to "detune" the blade cascade. Multiple identical blade groups or pairs (10', 20') are situated next to each other in the circumferential direction (horizontally in FIG. 1), FIG. 1 showing only one blade group (10', 20') and one individual blade 10' of an adjoining blade group. This adjoining group corresponds to illustrated blade group (10', 20') so that the blade cascade has the configuration (10', 20'), (10', 20'), (10', 20'), . . . .

First and second side walls 11', 21' have identical contourings in the moving blade cascade of FIG. 1 according to practical in-house experience. This results in particular in radial vibrations between adjoining individual blades 10', 20'.

FIG. 2 shows a portion of a moving blade cascade of a gas turbine aircraft engine according to one embodiment of the present invention in an illustration corresponding to FIG. 1. Features which correspond to each other are denoted by identical reference numerals, features of the practical in-house experience in FIG. 1 being identified by an apostrophe ('). As a result, only the differences from the embodiment of FIG. 1 are addressed, and otherwise reference is made to the description of that figure.

The moving blade cascade of FIG. 2 according to one embodiment of the present invention includes multiple identical blade groups or pairs (10, 20), which in turn include a first individual blade 10 and a second individual blade 20 which is different from the first, first and second individual blades 10, 20 differing in particular in their blade profiles to "detune" the blade cascade. Multiple identical blade groups or pairs (10, 20) are situated next to each other in the circumferential direction, FIG. 2 also showing only one blade group (10, 20) and one first individual blade 10 of an adjoining blade group. The blade cascade thus has the configuration (10, 20), (10, 20), (10, 20), . . . including identical blade groups (10, 20) having first and other individual blades 10, 20, the other blades being different from the first.

First and second side walls 11, 21 have different contourings in the moving blade cascade of FIG. 2 according to one embodiment of the present invention. It is apparent that, in the circumferential direction, first side walls 11 have a contouring which is essentially convex to the flow channel, while second side walls 21 have a contouring which is concave to the flow channel, so that, contrary to the one shown in FIG. 1, the blade cascade of FIG. 2 has no radially inner side wall which is periodic with the blade pitch. However, the radially inner side wall of the blade cascade of FIG. 2 is periodic with the blade groups, i.e., it is recurrent with each of the consecutive or adjoining blade groups (10, 20). At the top, FIG. 2 shows radially outer side walls 17, 27 in the form of a blade shroud, having contours on the radially inner surface.

With the exception of the outside edges, the contouring of side wall 11 of the first individual blades deviates in all circumferential positions from the contouring of side wall 21 of the adjoining second individual blades in a corresponding circumferential position in the radial direction.

It is apparent from the combination of second individual blade 20 with first individual blade 10 shown on the right in FIG. 2 that the contouring of the right outside edge of side wall 21 of blade 20 of the outer group in FIG. 2 corresponds to the contouring of the left outside edge of side wall 11 of the other blade 10 of the outer group in FIG. 2.

It is apparent from the combination of second individual blade 20 with first individual blade 10 shown on the left in FIG. 2 that the contouring of the right outside edge of side wall 11 of first blade 10 of one blade group (10, 20) in FIG. 2 corresponds to the contouring of the adjoining left outside edge of side wall 21 of the adjoining second individual blade 20 of this group (10, 20) in FIG. 2.

In this way, radial projections within blade groups (10, 20) and between blade groups (10, 20), (10, 20) are avoided.

FIG. 3 shows a portion of a moving blade cascade of a gas turbine aircraft engine according to one further embodiment of the present invention in an illustration corresponding to FIGS. 1, 2. Mutually corresponding features are denoted by identical reference numerals, so that only the differences from the embodiment of FIGS. 1, 2 are addressed, and otherwise reference is made to their description.

In the embodiment of FIG. 3, each of the blade groups includes another, third individual blade 30 having a vane 32 having a blade profile and a side wall 31.

First, second and third individual blades 10, 20, 30 differ in particular in their blade profiles to "detune" the blade cascade. Multiple identical blade groups or triplets (10, 20, 30) are situated next to each other in the circumferential direction, FIG. 3 showing only one blade group (10, 20, 30). The blade cascade thus has the configuration (10, 20, 30), (10, 20, 30), (10, 20, 30), . . . including identical blade groups (10, 20, 30) having first, dissimilar second and dissimilar third individual blades 10, 20 and 30.

Third side walls 31 have a contouring which differs from first side wall 11 and second side wall 21. It is apparent that, in the circumferential direction, first side walls 11 have a contouring which is essentially convex to the flow channel, second side walls 21 have a contouring which is concave to the flow channel, and third side walls 31 have a contouring, in the circumferential direction, which is essentially convex to the flow channel and which is inverse or mirror symmetrical to that of first side walls 11, so that the blade cascade of FIG. 3 also has no radially inner side wall which is periodic with the blade pitch. The radially inner side wall of the blade cascade of FIG. 3 is also periodic with the blade groups, i.e., it is recurrent with each of the consecutive or adjoining blade groups (10, 20, 30).

With the exception of the outside edges, the contouring of side wall 11 of the first individual blades deviates in all circumferential positions from the contouring of side wall 21 of the adjoining second individual blades in a corresponding circumferential position in the radial direction. With the exception of the outside edges, the contouring of side wall 31 of the third individual blades also deviates in all circumferential positions from the contouring of side wall 21 of the adjoining second individual blades in a corresponding circumferential position in the radial direction. With the exception of a blade center, the contouring of side wall 31 of the third individual blades additionally deviates in all circumferential positions from the contouring of side wall 11 of the first individual blades in a corresponding circumferential position in the radial direction.

It is apparent from the combination that the contouring of the right outside edge of side wall 31 of blade 30 of the outer group in FIG. 3 corresponds to the contouring of the left outside edge of side wall 11 of the other blade 10 of the outer group in FIG. 3.

It is additionally apparent from the combination of second individual blade 20 with first individual blade 10 or third individual blade 30 that the contouring of the right outside edge of side wall 11 of first individual blade 10 in FIG. 2 corresponds to the contouring of the adjoining, left outside edge of side wall 21 of the adjoining second individual blade 20 of this blade group in FIG. 2, and that the contouring of the left outside edge of side wall 31 of third individual blade 30 in FIG. 2 corresponds to the contouring of the adjoining, right outside edge of side wall 21 of the adjoining second individual blade 20 of this blade group in FIG. 2.

In this way, radial projections within blade groups (10, 20, 30) and between blade groups (10, 20, 30), (10, 20, 30) are once again avoided.

FIG. 4 shows a perspective view of a portion of a moving blade cascade of a gas turbine aircraft engine according to a further embodiment of the present invention. Mutually corresponding features are denoted by identical reference numerals, so that only the differences from the embodiment of FIGS. 1 through 3 are addressed, and otherwise reference is made to their description.

While in FIGS. 1 through 3 the contouring varies only in the circumferential direction and only in a simple manner for clarification, the embodiment of FIG. 4 also has different contourings of side walls 11, 21 of the first and second individual blades 10, 20 in the axial direction, the second blades differing from the first. Once again, radial projections within blade groups (10, 20) and between blade groups (10, 20), (10, 20) are avoided.

LIST OF REFERENCE NUMERALS

10(') first individual blade
11('), 21('), 31 blade platform (side wall)
12('), 22('), 32 vane
13('), 23('), 33 blade root
20(') second individual blade
30 third individual blade

What is claimed is:

1. A blade cascade for a turbomachine comprising:
a plurality of identical blade groups situated next to each other in a circumferential direction, each blade group including:
a first individual blade having a first vane containing a first blade profile and a first side wall and the first side wall further including a first radial inner side wall,
a second individual blade differing from the first individual blade and having a second vane containing a second blade profile and a second side wall, the second side wall having a different contouring than the first side wall, the second side wall further including a second radial inner side wall that circumferentially adjoins to the first radial inner side wall, the first radial inner side wall and the second radial inner side wall, respectively, having radial depressions defined therein, and a circumferential working fluid flow channel of each blade group that is at least partially defined by the circumferentially adjoined first and second radial inner side walls.

2. The blade cascade as recited in claim 1 wherein the contouring of a first outside edge of the first side wall corresponds to the contouring of a second outside edge of the second side wall.

3. The blade cascade as recited in claim 2 wherein the first outside edge and the second outside edge adjoin.

4. The blade cascade as recited in claim 1 wherein the first individual blade and the second individual blade have different profiles, masses, rigidities, mass or rigidity distributions.

5. The blade cascade as recited in claim 1 wherein the contouring of the first side wall deviates from the contouring of the second side wall in a radial direction by at least 1% of a blade height of the blade cascade.

6. The blade cascade as recited in claim 5 wherein the contouring of the first side wall deviates from the contouring of the second side wall in a radial direction by at least 2% of a blade height of the blade cascade.

7. The blade cascade as recited in claim 5 wherein the contouring of the first side wall deviates from the contouring of the second side wall in a radial direction by at least 2.5% of a blade height of the blade cascade.

8. The blade cascade as recited in claim 5 wherein the first side wall and the second side wall adjoin circumferentially.

9. The blade cascade as recited in claim 5 wherein the contouring of the first side wall deviates from the contouring of the second side wall in a radial direction by at least 1 mm.

10. The blade cascade as recited in claim 5 wherein the contouring of the first side wall deviates from the contouring of the second side wall in a radial direction by at least 2 mm.

11. The blade cascade as recited in claim 1 wherein the contouring of the first side wall deviates from the contouring of the second side wall in a radial direction by at least 0.1 mm.

12. The blade cascade as recited in claim 11 wherein the first side wall and the second side wall adjoin circumferentially.

13. A gas turbine comprising at least one compressor or turbine stage having a blade cascade as recited in claim 1, the blade cascade being a guide or moving blade cascade.

14. An aircraft engine comprising a gas turbine as recited in claim 13.

* * * * *